(12) United States Patent
Liao et al.

(10) Patent No.: US 8,098,992 B2
(45) Date of Patent: Jan. 17, 2012

(54) MULTIPURPOSE INFRARED APPARATUS AND DISPLAY APPARATUS THEREOF

(75) Inventors: Tung-Tsai Liao, Hsin Chu (TW); Li Sheng Lo, Hsin Chu County (TW); Che-Hui Wang, Taipei (TW)

(73) Assignee: Generalplus Technology Inc., Hsinchu (TW)

( * ) Notice: Subject to any disclaimer, the term of this patent is extended or adjusted under 35 U.S.C. 154(b) by 321 days.

(21) Appl. No.: 12/560,712

(22) Filed: Sep. 16, 2009

(65) Prior Publication Data
US 2010/0277653 A1 Nov. 4, 2010

(30) Foreign Application Priority Data
Apr. 30, 2009 (TW) .............................. 98114323 A (51) Int. Cl.
*H04B 10/20* (2006.01)
*H04B 10/00* (2006.01)

(52) U.S. Cl. ........ 398/123; 398/128; 398/129; 398/130; 398/131

(58) Field of Classification Search .......... 398/128–131, 398/123
See application file for complete search history.

(56) References Cited

U.S. PATENT DOCUMENTS

| | | | | |
|---|---|---|---|---|
| 6,292,283 | B1* | 9/2001 | Grandbois | 398/107 |
| 6,944,483 | B1* | 9/2005 | Motohashi | 455/574 |
| 7,263,292 | B1* | 8/2007 | Siu | 398/106 |
| 7,266,301 | B2* | 9/2007 | Stanchfield et al. | 398/126 |
| 7,450,852 | B2* | 11/2008 | Calhoon | 398/106 |
| 7,668,503 | B1* | 2/2010 | Schumann et al. | 455/11.1 |
| 2008/0037992 | A1* | 2/2008 | Koplar et al. | 398/128 |
| 2008/0145058 | A1* | 6/2008 | Fukae et al. | 398/118 |
| 2008/0219672 | A1* | 9/2008 | Tam et al. | 398/130 |
| 2009/0028572 | A1* | 1/2009 | Watanabe | 398/118 |
| 2009/0052902 | A1* | 2/2009 | Shinokura | 398/118 |
| 2009/0067847 | A1* | 3/2009 | Nakamura | 398/128 |
| 2009/0067853 | A1* | 3/2009 | Cunneen et al. | 398/200 |
| 2010/0034540 | A1* | 2/2010 | Togashi | 398/118 |
| 2010/0277653 | A1* | 11/2010 | Liao et al. | 348/734 |
| 2010/0329691 | A1* | 12/2010 | Schenk et al. | 398/130 |

* cited by examiner

*Primary Examiner* — Danny Leung
(74) *Attorney, Agent, or Firm* — Muncy, Geissler, Olds & Lowe, PLLC (57) ABSTRACT

The present invention relates to a multipurpose infrared apparatus and a display apparatus thereof. The display apparatus includes a display panel and the multipurpose infrared apparatus, wherein the multipurpose infrared apparatus includes an infrared light emitted diode (hereinafter refer to as, IR LED) transmitter, an IR receiver and a microcontroller. The IR LED transmitter is used for transmitting infrared ray. The IR receiver is used for receiving infrared ray. The microcontroller utilizes the Time-Division Multiplexing method to control the IR LED transmitter and receiver to achieve the distance detecting, the remote control signal receiving and an ambient light detecting.

16 Claims, 6 Drawing Sheets

MULTIPURPOSE INFRARED APPARATUS AND DISPLAY APPARATUS THEREOF

This application claims priority of No. 098114323 filed in Taiwan R.O.C. on Apr. 30, 2009 under 35 USC 119, the entire content of which is hereby incorporated by reference.

BACKGROUND OF THE INVENTION

1. Field of the Invention

The present invention relates to the technology of a light emitted diode (LED), and more particularly to a display with a transmitter or receiver using LED and a multipurpose infrared apparatus therein.

2. Related Art

Figure 1:
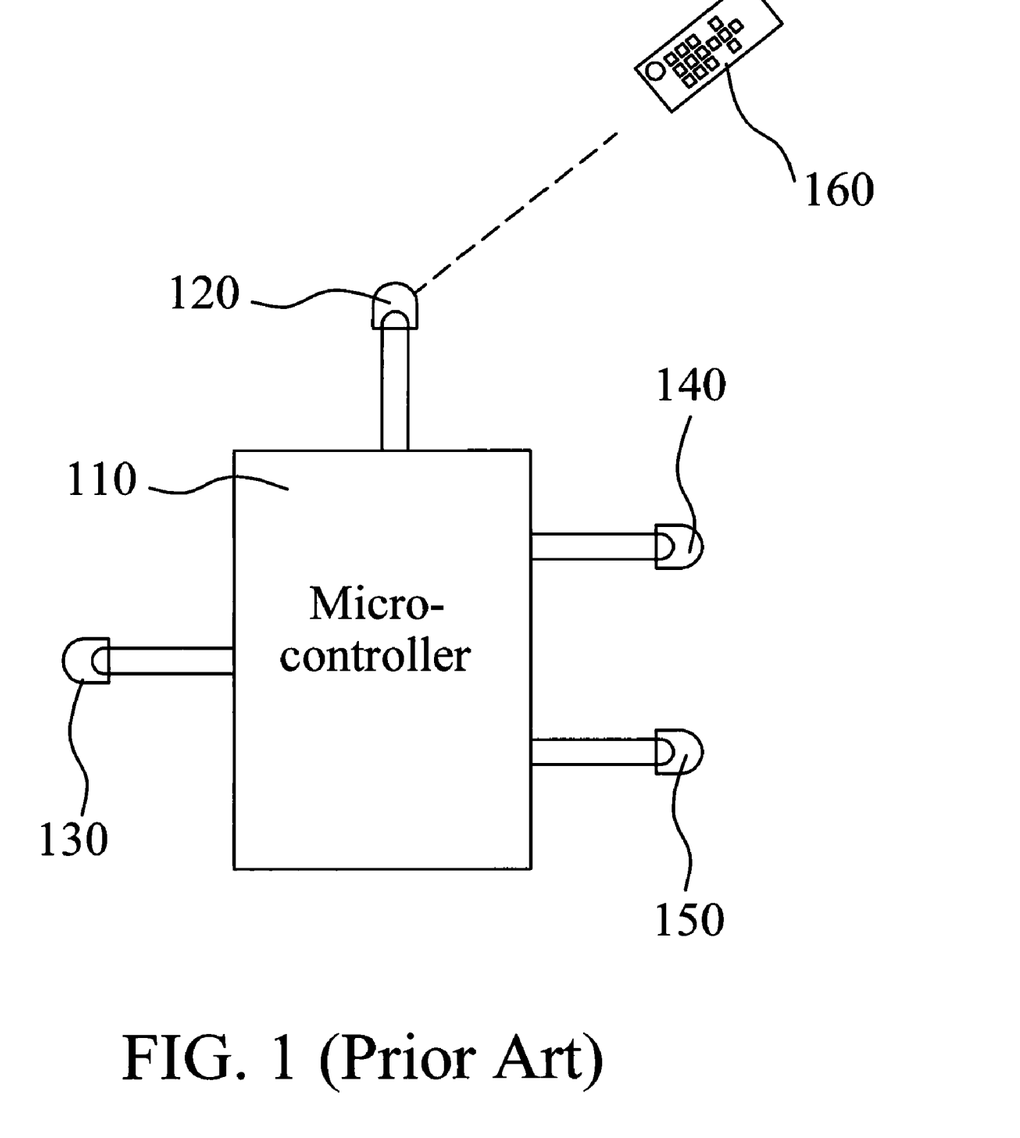
FIG. 1 is a circuit block diagram depicting a digital photo frame according to the prior art.

With the progress of the technology, many electronic products are developed toward the development of multi-function so that the electronic products can be conformed to the diverse requirement of end user. For example, the control interface of the present digital photo frame has to use multiple receiving and transmitting modules to achieve the functions of receiving of remote control, power saving and distance detecting. FIG. 1 is a circuit block diagram depicting a conventional digital photo frame. Referring to FIG. 1, the digital photo frame includes a microcontroller 110, an infrared receiver for remote control 120, a light sensor 130, an infrared transmitter 140 and an infrared receiver 150.

With regard to the function of remote control, the infrared receiver 120 receives the infrared carrier signal with 38 kHz transmitted by the remote control 160. The microcontroller 110 decodes the infrared carrier signal to obtain a control code according to the level of the infrared carrier signal. The light sensor 130 is used for detecting the intensity of the ambient light surrounding the digital photo frame, and according to the detecting result thereof, the microcontroller 110 adjusts the backlight of the digital photo frame to achieve power saving. Presently, the light sensor 130 can be implemented by ON9668, KPS-3227SPIC, or a general photo sensor, such as photo diode, CdS and so on. In addition, the infrared transmitter 140 is used for emitting the infrared carrier signal. Since the infrared carrier signal will be reflected when the infrared carrier signal encounters an object, the infrared receiver 150 is used for detecting whether the infrared carrier signal is received, and the microcontroller 110 determines whether there is an object surrounding the digital photo frame according to the detecting result. In other words, when there is someone being close to the digital photo frame, the infrared receiver 150 will receive the infrared carrier signal, and then the microcontroller 110 will determine that there is an object surrounding the digital photo frame so that the digital photo frame is controlled to start playing. Contrary, when the microcontroller 110 determines that there is no object surrounding the digital photo frame, the digital photo frame is controlled to stop playing.

From the abovementioned prior art, in order to achieve the multi-function built in the digital photo frame, a plurality of elements, such as the infrared receivers, light sensor, infrared transmitter and so on, is prerequisite. However, in consideration of the cost of product, the number of the element in the product and product maintaining, the cost of manufacture and production will be increased while the product uses too many elements, and the product is difficult to perform mass production.

SUMMARY OF THE INVENTION

In view of this, it is therefore an objective of the present invention to provide a display apparatus with multi-function to achieve the reduction of production cost.

An another object of the present invention is to provide a multipurpose infrared apparatus for combining at least the functions of distance detecting, remote controlling and ambient light detecting, so that the power consumption can be reduced in the electronic product using the same and the electronic product can be remotely controlled.

To achieve the above-identified or other objectives, the present invention provides a display apparatus. The display apparatus includes a display panel, an infrared (hereinafter refer to as IR) light emitted diode (hereinafter refer to as LED) transmitter, an IR receiver and a microcontroller. The IR LED transmitter includes a first terminal and a second terminal and is used for emitting an IR. The IR receiver includes a first terminal, a second terminal and a third terminal, and is used for receiving an IR. The microcontroller includes a first pin, a second pin, a third pin, a fourth pin and a fifth pin, wherein the first pin thereof is coupled to the first terminal of the IR transmitter, the second pin thereof is coupled to the second terminal of the IR LED transmitter, the third pin thereof is coupled to the first terminal of the IR receiver, the fourth pin thereof is coupled to the second terminal of the IR receiver, the fifth pin thereof is coupled to the third terminal of the IR receiver.

In a remote control signal receiving period, the microcontroller receives an IR remote control signal from a remote control through the third pin, fourth pin and fifth pin according to a specific protocol to control the display panel.

In a distance detecting period, the microcontroller controls a current intensity flowing through the IR LED transmitter through the first pin and second pin to output a specific IR signal and then determines a distance between the display apparatus and an external object according to the current intensity.

In an ambient light detecting period, the microcontroller detects the photoelectric current of the IR LED transmitter to determine an intensity of an ambient light, wherein the microcontroller controls the backlight illumination of the display panel according to the intensity of the ambient light.

In the display apparatus according to the preferred embodiment of the present invention, the IR LED transmitter includes a first current-limiting resistor and a first LED. The first current-limiting resistor includes a first terminal and a second terminal, wherein the first terminal thereof is coupled to the first pin of the microcontroller. The first LED includes a first terminal and a second terminal, wherein the first terminal thereof is coupled to the second terminal of the first current-limiting resistor, and the second terminal thereof is coupled to the second pin of the microcontroller. In the distance detecting period, the microcontroller controls the intensity of the specific IR signal according to the current intensity outputted from the first pin thereof.

In the display apparatus according to the preferred embodiment of the present invention, in the ambient light detecting period, the microcontroller provides a reverse bias on the first LED through the first pin thereof and the second pin thereof and then detects the photoelectric current of the first LED to determines the intensity of the ambient light.

In the display apparatus according to the preferred embodiment of the present invention, the first terminal of the first LED is anode, and the second terminal of the first LED is cathode.

In the display apparatus according to the preferred embodiment of the present invention, the microcontroller further includes a sixth pin, and the IR LED transmitter includes a transistor, a second current-limiting resistor and a second LED. The transistor includes a base terminal, a first emitter/ collector terminal and a second emitter/collector terminal.

The base terminal of the transistor is coupled to the first terminal of the microcontroller, the first emitter/collector terminal thereof is coupled to a reference voltage, and the second emitter/collector terminal thereof is coupled to the sixth pin of the microcontroller. The second current-limiting resistor includes a first terminal and a second terminal, wherein the first terminal thereof is coupled to the second emitter/collector terminal of the transistor. The second LED includes a first terminal and a second terminal, wherein the first terminal thereof is coupled to the second terminal of the second current-limiting resistor, and the second terminal thereof is coupled to the second pin of the microcontroller.

In the display apparatus according to the preferred embodiment of the present invention, in the distance detecting period, the first pin and the second pin of the microcontroller are set to logic low voltage, and the sixth pin of the microcontroller is set to high impedance state. And then the microcontroller controls the intensity of the specific IR signal according to the current intensity outputted from the first pin thereof.

In the display apparatus according to the preferred embodiment of the present invention, in the ambient light detecting period, the first pin and the second pin of the microcontroller are set to logic high voltage, and the sixth pin is set to logic low voltage. And then the microcontroller provides a reverse bias to the second LED through the second pin and sixth pin and detects the photoelectric current of the second LED to determine the intensity of ambient light.

In the display apparatus according to the preferred embodiment of the present invention, the first terminal of the second LED is anode, and the second terminal of the second LED is cathode.

In the display apparatus according to the preferred embodiment of the present invention, the remote control signal receiving period is longer than the distance detecting period or the ambient light detecting period.

The present invention further provides a multipurpose infrared apparatus adapted for a display apparatus. The multipurpose infrared apparatus includes an infrared (hereinafter refer to as IR) light emitted diode (hereinafter refer to as LED) transmitter, an IR receiver and a microcontroller. The IR LED transmitter includes a first terminal and a second terminal and is used for emitting an IR. The IR receiver includes a first terminal, a second terminal and a third terminal, and is used for receiving an IR. The microcontroller includes a first pin, a second pin, a third pin, a fourth pin and a fifth pin, wherein the first pin thereof is coupled to the first terminal of the IR transmitter, the second pin thereof is coupled to the second terminal of the IR LED transmitter, the third pin thereof is coupled to the first terminal of the IR receiver, the fourth pin thereof is coupled to the second terminal of the IR receiver, the fifth pin thereof is coupled to the third terminal of the IR receiver.

In a remote control signal receiving period, the microcontroller receives an IR remote control signal from a remote control through the third pin, fourth pin and fifth pin according to a specific protocol to control the display panel to control the display apparatus.

In a distance detecting period, the microcontroller controls a current intensity flowing through the IR LED transmitter through the first pin and second pin to output a specific IR signal and then determines a distance between the display apparatus and an external object according to the current intensity.

In an ambient light detecting period, the microcontroller detects the photoelectric current of the IR LED transmitter to determine an intensity of an ambient light, wherein the microcontroller controls the backlight illumination of the display apparatus according to the intensity of the ambient light.

In the multipurpose infrared apparatus according to the preferred embodiment of the present invention, the IR LED transmitter includes a first current-limiting resistor and a first LED. The first current-limiting resistor includes a first terminal and a second terminal, wherein the first terminal thereof is coupled to the first pin of the microcontroller. The first LED includes a first terminal and a second terminal, wherein the first terminal thereof is coupled to the second terminal of the first current-limiting resistor, the second terminal thereof is coupled to the second pin of the microcontroller. In the distance detecting period, the microcontroller controls the intensity of the specific IR signal emitted from the first LED through the current intensity outputted from the first pin.

In the multipurpose infrared apparatus according to the preferred embodiment of the present invention, the first terminal of the first LED is anode, and the second terminal of the first LED is cathode.

In the multipurpose infrared apparatus according to the preferred embodiment of the present invention, the microcontroller further includes a sixth pin, and the IR LED transmitter includes a transistor, a second current-limiting resistor and a second LED. The transistor includes a base terminal, a first emitter/collector terminal and a second emitter/collector terminal. The base terminal of the transistor is coupled to the first pin of the microcontroller, the first emitter/collector terminal thereof is coupled to a reference voltage source, and the second emitter/collector terminal thereof is coupled to the sixth pin of the microcontroller. The second current-limiting resistor includes a first terminal and a second terminal, wherein the first terminal thereof is coupled to the second emitter/collector terminal of the transistor. The second LED includes a first terminal and a second terminal, wherein the first terminal thereof is coupled to the second terminal of the second current-limiting resistor, and the second terminal thereof is coupled to the second pin of the microcontroller.

In the multipurpose infrared apparatus according to the preferred embodiment of the present invention, in the distance detecting period, the first pin and the second pin of the microcontroller is set to logic low voltage, and the sixth pin is set to high impedance state. The microcontroller controls the specific IR signal emitted from the second LED through the current intensity outputted from the first pin of the microcontroller.

In the multipurpose infrared apparatus according to the preferred embodiment of the present invention, the first terminal of the second LED is anode, and the second terminal of the second LED is cathode.

In the multipurpose infrared apparatus according to the preferred embodiment of the present invention, the remote control signal receiving period is longer than the distance detecting period or the ambient light detecting period.

The spirit of the present invention is to utilize the time-division multiplexing (TDM) in the microcontroller to control IR LED transmitter and IR receiver so that the display apparatus can achieve the functions of distance detecting, remote control signal receiving and ambient light detecting. Meanwhile, in view of the manufacturing, the cost of the production may be reduced since the number of elements is reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 2:
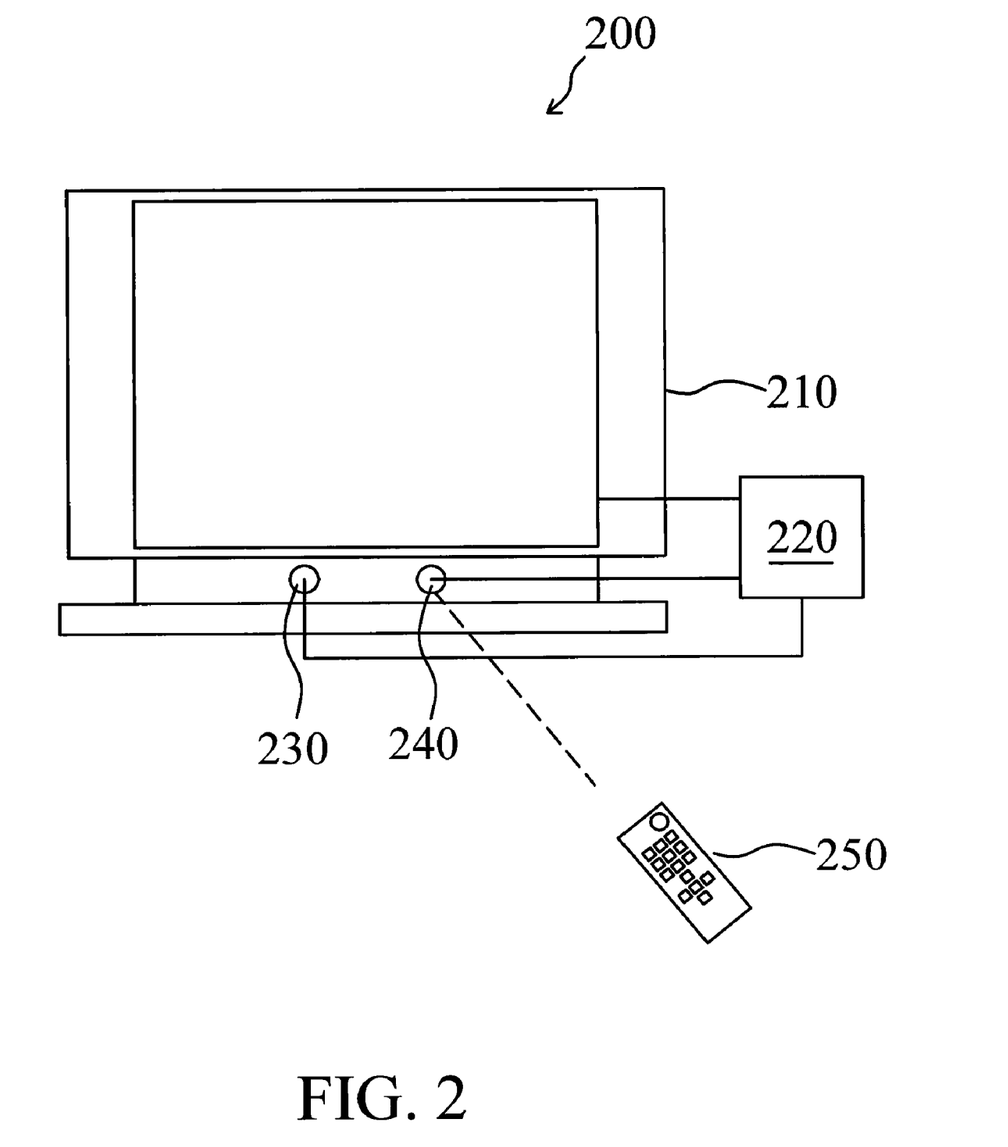
FIG. 2 is an apparatus diagram depicting a display apparatus according to an embodiment of the present invention.

FIG. 2 is an apparatus diagram depicting a display apparatus according to an embodiment of the present invention. Referring to FIG. 2, the display apparatus 200 includes a display panel 210, a microcontroller 220, an infrared (hereinafter referred to as IR) light emitted diode (hereinafter referred to as LED) transmitter 230 and an IR receiver 240. In order to clearly illustrate the embodiment of the present invention, an additional remote control 250 is drawn in the FIG. 2. Assume the display apparatus 200 is a digital photo frame in this embodiment. Generally speaking, the digital photo frame may includes following three functions of:

1. remote control signal receiving, for controlling displayed photo or multimedia of the display apparatus 200 through a remote control by end user;

2. ambient light detecting and corresponding backlight control, wherein in order to obtain the balance of display effect and power consumption, this function is prerequisite;

3. distance detecting for detecting the distance between the digital photo frame and an external end user, wherein the digital photo frame can enter the sleep mode through this function to achieve power saving when end user does not behold in the vicinity of the digital photo frame.

Hereinafter, based on the abovementioned three functions, the embodiment of the present invention is illustrated as follow.

The microcontroller 220 is coupled to the display panel 210, the IR LED transmitter 230 and the IR receiver 240. In this embodiment, the microcontroller 220 utilizes time-division multiplexing (TDM) to control the IR LED transmitter 230 and IR receiver 240 in different time periods such that the display apparatus 200 has the functions of distance detecting, remote control signal receiving and ambient light detecting.

Figure 3:
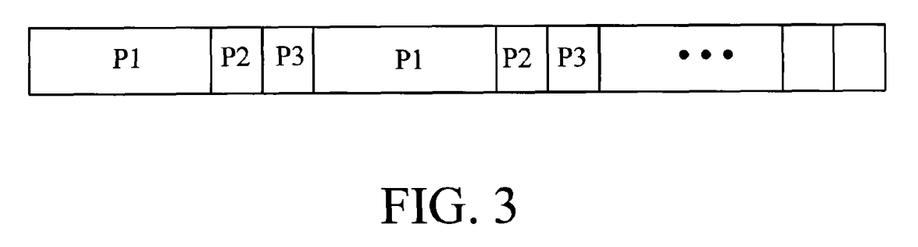
FIG. 3 is a time period distribution diagram according to an embodiment of the present invention.

The distribution of the abovementioned time periods is shown in FIG. 3. FIG. 3 is a time period distribution diagram according to an embodiment of the present invention. Referring to FIG. 2 and FIG. 3, the time periods includes a remote control signal receiving period P1, a distance detecting period P2 and an ambient light detecting period P3.

During the remote control signal receiving period P1, the microcontroller 220 enters a remote control signal receiving mode and then controls the IR receiver 240 to work as the remote control signal receiving mode. Meanwhile, the IR receiver 240 receives an IR remote control signal emitted from a remote control 250. The microcontroller 220 decodes the received IR remote control signal and controls the display panel 210 according to the decoded IR remote control signal.

Afterward, during the distance detecting period P2, the microcontroller 220 enters the distance detecting mode, and controls the IR LED transmitter 230 and the IR receiver 240 to work as the distance detecting mode. Meanwhile, the microcontroller 220 controls the current intensity flowing through the IR LED transmitter 230 so that the IR LED transmitter 230 emits a specific IR signal, wherein the intensity and the emitted distance of the specific IR signal are controlled by the microcontroller 220 according to the current intensity. Furthermore, during the distance detecting period P2, since the transmitted velocity of the specific IR signal is speedy, the emitted specific IR signal will be reflected to the display apparatus 200 when there is an external object in the vicinity of the display apparatus 200.

When the IR receiver 240 receives the reflected specific IR signal, it represents that the distance between an external object and the display apparatus 200 is fallen in a range of the specific IR signal. At this time, the microcontroller 220 determines the distance between the external object and the display apparatus 200 according to the current intensity. When the IR receiver 240 cannot receive the reflected specific IR signal with different current intensities outputted from the microcontroller 220, the microcontroller 220 determines that there is no external object in the vicinity of the display apparatus 200. If the microcontroller 220 determines that there is no external object in the vicinity of the display apparatus 200 for a period of time, such as 5 or 10 minutes, the microcontroller 220 shuts the display apparatus 200 or controls the display apparatus 200 entering the sleep mode so that the function of power saving is achieved.

During the ambient light detecting period P3, the microcontroller 220 enters the ambient light detecting mode and controls the IR LED transmitter 230 to work as the ambient light detecting mode. Meanwhile, the microcontroller 220 detects the photoelectric current of the IR LED transmitter 230 to determine the intensity of the ambient light. After the determination of the intensity of the ambient light, the microcontroller 220 adjusts the backlight intensity of the display panel 210 according to the intensity of the ambient light to achieve the function of power saving.

In the abovementioned embodiment, the principle of the distribution of the periods P1, P2 and P3 is that the length of the period P1 is greatly longer than the period P2 or the period P3. Due to the consideration of habit of end user, the operation through the remote control 250 requires more sensitive response, that is, the display apparatus 200 need rapidly respond the IR remote control signal emitted from the remote control 250. Thus, the microcontroller 220 need longer remote control signal receiving period P1. The ambient light and the distance between the external object and display apparatus may not severely vary as time.

In addition, the purpose of ambient light detecting and distance detecting is power saving. Therefore, the preferred design is adapted according to weighing the miscellaneous factors. However, the length or the sequence of the remote control signal receiving period P1, the distance detecting period P2 and the ambient light detecting period P3 can arrange according to the function of product. The distribution of the periods of the present invention is not restricted thereto. In addition, in the abovementioned embodiment, the IR LED transmitter 230 in the ambient light detecting period P3 is used for performing the ambient light detecting.

Figure 4:
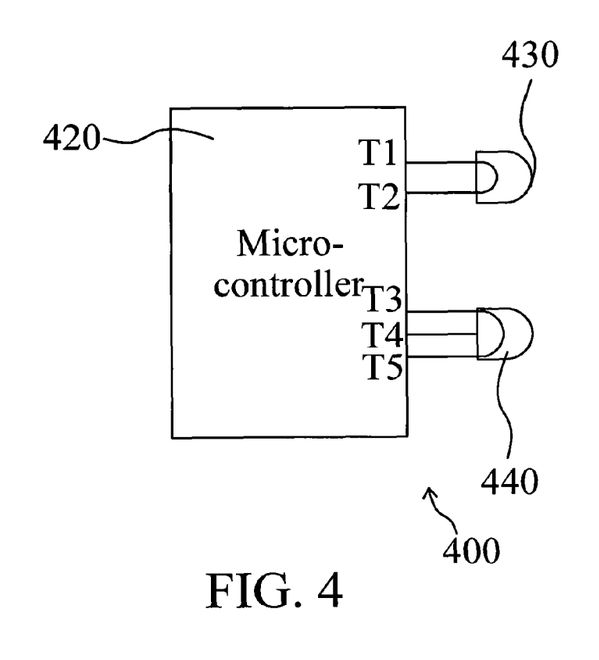
FIG. 4 is a circuit block diagram depicting a multipurpose infrared apparatus according to an embodiment of the present invention.

For one having ordinary skill in the art to implement the spirit of the present invention, another multipurpose infrared apparatus adapted for a display apparatus is additionally provided hereininafter. FIG. 4 is a circuit block diagram depicting a multipurpose infrared apparatus according to an embodiment of the present invention. Referring to FIG. 4, the multipurpose infrared apparatus 400 includes a microcontroller 420, an IR LED transmitter 430 and an IR receiver 440. The microcontroller 420 includes a first pin T1, a second pin T2, a third pin T3, a fourth pin T4 and a fifth pin T5. The IR LED transmitter 430 includes a first terminal and a second terminal, wherein the first terminal thereof and the second terminal thereof are respectively coupled to the first pin T1 and second pin T2 of the microcontroller 420. The IR receiver 440 includes a first terminal, a second terminal and a third terminal, wherein the first terminal thereof, the second terminal thereof and the third terminal thereof are respectively coupled to the third pin T3, the fourth pin T4 and the fifth pin T5 of the microcontroller 420.

Figure 5:
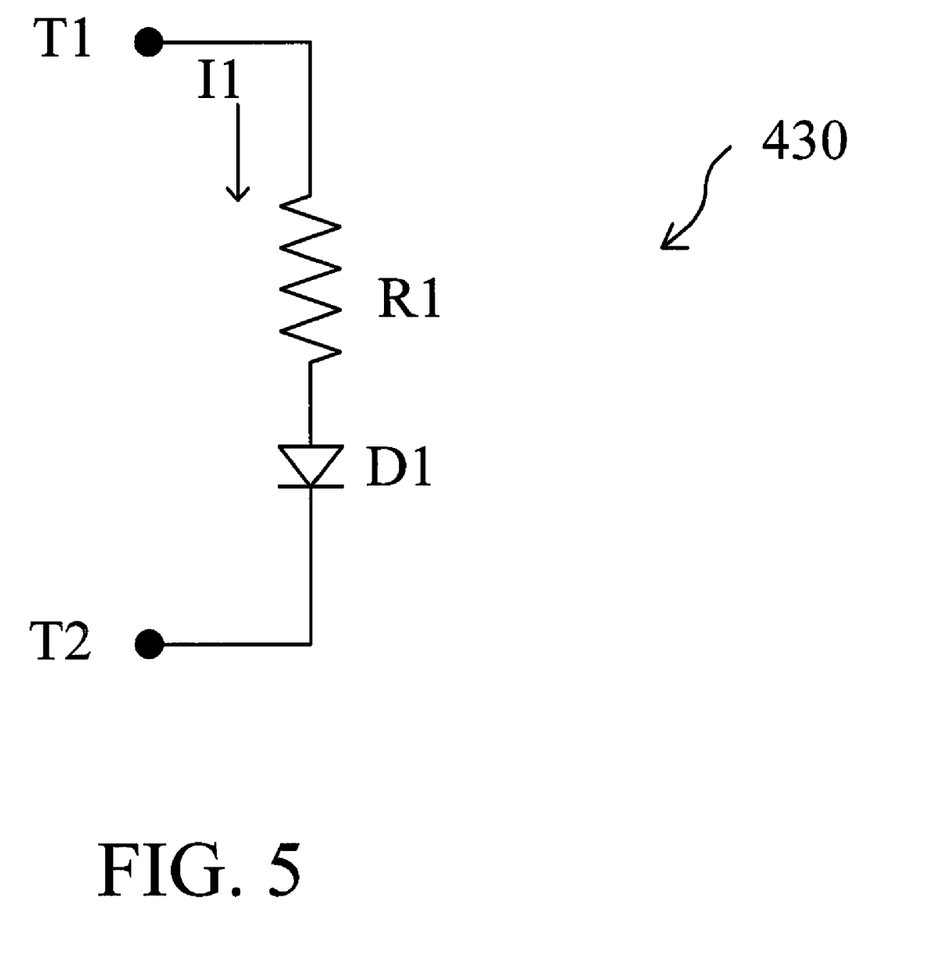
FIG. 5 is a circuit diagram depicting the infrared LED transmitter 430 according to an embodiment of the present invention.

FIG. 5 is a circuit diagram depicting the infrared LED transmitter 430 according to an embodiment of the present invention. Referring to FIG. 5, the IR LED transmitter 430 includes a first current-limiting resistor R1 and a first LED D1, and the coupling relationship is shown in FIG. 5. In this embodiment, the microcontroller 420 utilizes a time division multiplexing to control the IR LED transmitter 430 and the IR receiver 440 in different periods so that the display apparatus has the functions of distance detecting, IR remote control signal receiving and ambient light detecting. The example of the distribution of the time periods is shown in FIG. 3.

Referring to FIG. 3 to FIG. 5, during the distance detecting period P2, the microcontroller 420 enter the distance detecting mode, and control the first pin T1 to output a current IL And then, the microcontroller 420 determines the specific IR signal emitted from the first LED DI according to the current intensity outputted from the first pin T1 of the microcontroller 420. During the distance detecting period P2, since the emission velocity of the specific IR signal is speedy, it represents there is an object in the range of the specific IR signal when the IR receiver 440 receives the reflected specific IR signal. At this time, the microcontroller 420 determines the distance between the object and the display apparatus according to the intensity of the current I1.

During the ambient light detecting period P3, the microcontroller 420 enters the ambient light detecting mode and provides a reverse bias to the first LED D1 through the first pin T1 and the second pin T2. Meanwhile, due to the characteristic of the LED, the first LED D1 in the reverse bias generates a photoelectric current according to the sensing ambient light. Thus, the microcontroller 420 determines the intensity of the ambient light by detecting the photoelectric current through the first pin T1 and the second pin T2.

During the remote control signal receiving period P1, the microcontroller 420 enters the remote control signal receiving mode for controlling the IR receiver 440 to receive an IR remote control signal emitted from a remote control (not shown on figure). In the present remote control technology, the IR remote control signal emitted from the remote control is a carrier signal with 38 KHz. The microcontroller 420 decodes the IR received remote control signal according to the specific protocol, and then controls the display apparatus according to the decoded IR remote control signal. Since the decoding technology for the IR remote control signal is extensively applied, and it is not the key of the embodiment, so the detail description is omitted.

Figure 6:
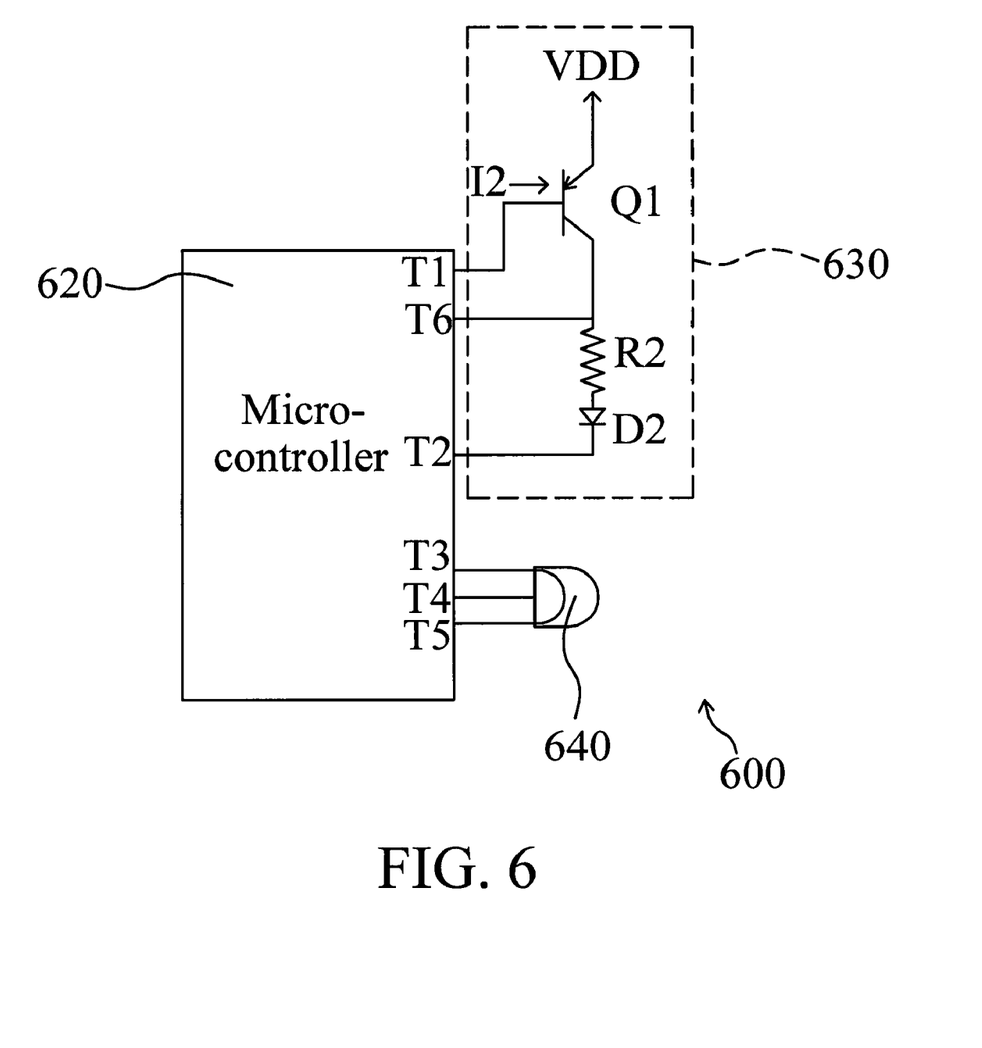
FIG. 6 is a circuit block diagram depicting a multipurpose infrared apparatus according to an embodiment of the present invention.

For one having ordinary skill in the art to implement the spirit of the present invention, another multipurpose infrared apparatus adapted for a display apparatus is provided hereinafter. FIG. 6 is a circuit block diagram depicting a multipurpose infrared apparatus according to an embodiment of the present invention. Referring to FIG. 6, the multipurpose infrared apparatus 600 includes a microcontroller 620, an IR LED transmitter 630 and an IR receiver 640. The microcontroller 620 includes a first pin T1, a second pin T2, a third pin T3, a fourth pin T4, a fifth pin T5 and a sixth pin T6, the coupling relationship thereof are shown as FIG. 6. The IR LED transmitter 630 includes a transistor Q1, a second current-limiting resistor R2 and a second LED D2. The base terminal of the transistor Q1 is coupled the first pin T1 of the microcontroller 620, the first emitter/collector terminal thereof is coupled to a reference voltage VDD, and the second emitter/collector terminal thereof is coupled to the sixth pin T6 of the microcontroller 620. The first terminal of the second current-limiting resistor R2 is coupled to the second emitter/collector terminal of the transistor Q1 and the sixth pin T6 of the microcontroller 620. The first terminal of the second LED D2 is coupled to the second terminal of the second current-limiting resistor R2, and the second terminal thereof is coupled to the second pin T2 of the microcontroller 620.

In the embodiment, the microcontroller 620 utilizes time-division multiplexing to control the IR LED transmitter 630 and the IR receiver 640 in different periods so that the display apparatus can have the functions of distance detecting, remote control signal receiving and ambient light detecting. The example of the distribution of the abovementioned periods is shown as FIG. 3.

Referring to FIG. 3 and FIG. 6, during the distance detecting period P2, the microcontroller 620 enters the distance detecting mode. Meanwhile, the first pin T1 and the second pin T2 of the microcontroller 620 is set to logic low voltage state, and then the sixth pin T6 of the microcontroller 620 is set to high impedance state so that the transistor Q1 becomes on-state. The microcontroller outputs a current I2 from the first pin T1, and the microcontroller 620 determines the intensity of a specific IR signal emitted from the second LED D2 through controlling the intensity of the current I2 outputted from the first pin T1. During the distance detecting period P2, since the emission velocity of the specific IR signal is speedy, it represents there is an object in the range of the specific IR signal when the IR receiver 640 receives the reflected specific IR signal. At this time, the microcontroller 620 determines the distance between the object and the display apparatus according to the intensity of the current I2.

From the abovementioned operation, the microcontroller 620 controls the current flowing through the emitter/collector terminals of the transistor Q1 through controlling the base current of transistor Q1 so that the driving current of the second LED D2 will be several times the original current I2. Therefore, the microcontroller 620 will be able to measure longer external object and distinguish the distance between the object and display apparatus more detailed.

During the ambient light detecting period P3, the microcontroller 620 enters the ambient light detecting mode. Meanwhile, the first pin T1 and the second pin T2 of the microcontroller 620 is set to logic high voltage state, and the sixth pin thereof T6 is set to logic low voltage state so that the transistor Q1 is cut off. The microcontroller 620 provides a reverse bias to the second LED D2 through the second pin T2 and sixth pin T6. Due to the characteristic of the LED, the second LED D2 in the reverse bias generates a photoelectric current according to the sensing ambient light. Thus, the microcontroller 620 determines the intensity of the ambient light by detecting the photoelectric current of the second LED D2 through the second pin T2 and the sixth pin T6. In addition, during the remote control signal receiving period P1, since the operations of the microcontroller 620 and the IR receiver 640 are the same as the operations of the microcontroller 420 and the IR receiver 440 in the abovementioned embodiment, the detail description is omitted in the embodiment.

Figure 7:
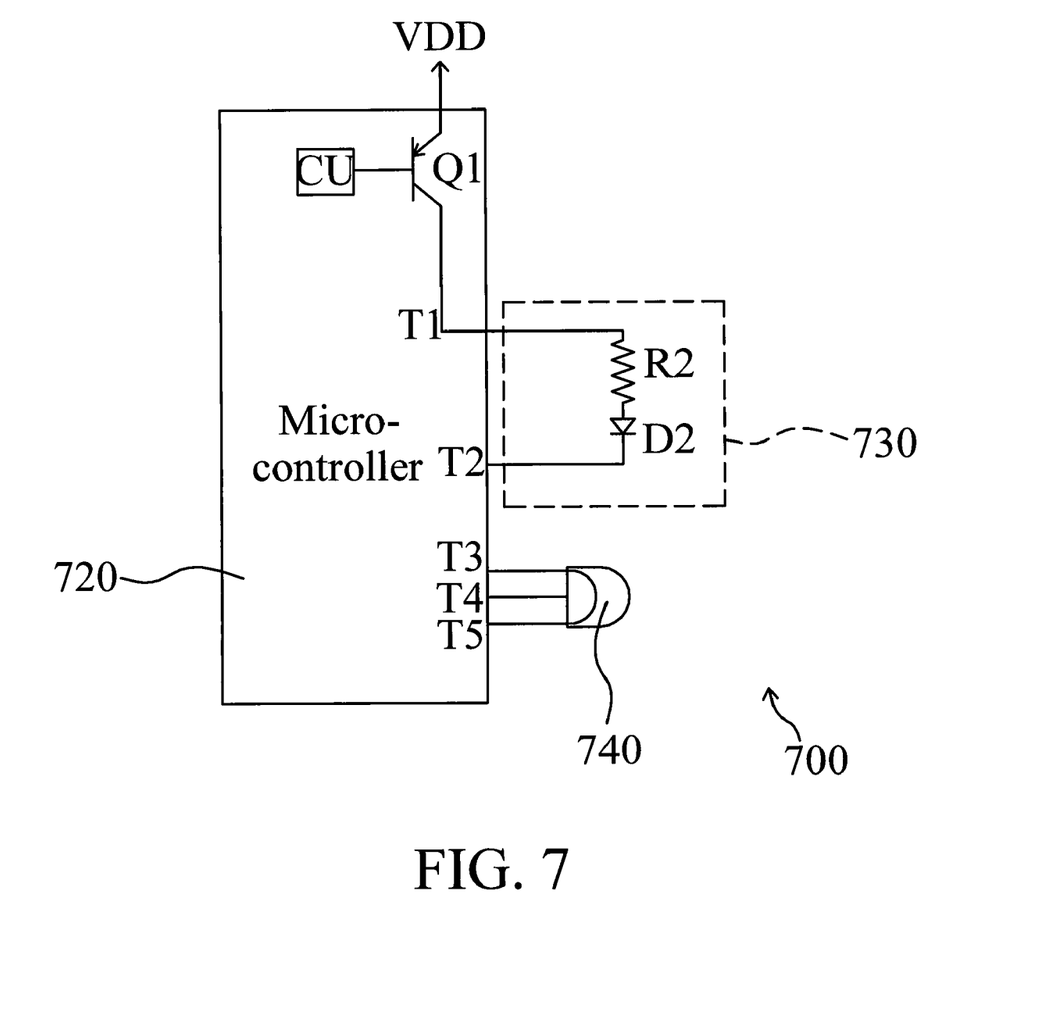
FIG. 7 is a circuit block diagram depicting a multipurpose infrared apparatus according to an embodiment of the present invention.

In the abovementioned embodiment, in consideration of the design of integrated circuit, the abovementioned transistor Q1 can be designed in the microcontroller. As shown in FIG. 7. FIG. 7 is a circuit block diagram depicting a multipurpose infrared apparatus according to an embodiment of the present invention. Referring to FIG. 7, the multipurpose infrared apparatus 700 includes a microcontroller 720, an IR LED transmitter 730 and an IR receiver 740, wherein the microcontroller 720 includes a control unit CU and a transistor Q1. Since the operation of the multipurpose infrared apparatus is the same as that of FIG. 6, thus the description in the identical portion is omitted. the difference is that the transistor Q1 is designed in the microcontroller 720. In addition, the control unit CU controls the base current of the transistor Q1 and its logic voltage level. In the embodiment of FIG. 7, the design can effectively reduce the pin count of the integrated circuit and the number of external element, so the manufacturing cost of the circuit can be reduced.

In addition, the transistor Q1 in the abovementioned embodiment utilizes a bipolar junction transistor (BJT) to be an example, nevertheless, one having ordinary skill in the art should know that the transistor Q1 can be replaced by metal oxide semiconductor field effect transistor (MOSFET). With regard to P type transistor or N type transistor used for the transistor Q1, the only difference of circuit design is control method. Therefore, the present invention is not restricted thereto.

In summary, the spirit of the present invention is to utilize the time-division multiplexing (TDM) in the microcontroller to control IR LED transmitter and IR receiver so that the display apparatus can achieve the functions of distance detecting, remote control signal receiving and ambient light detecting. Meanwhile, in view of the manufacturing, the cost of the production may be reduced since the number of elements is reduced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A display apparatus, comprising:
a display panel;
an infrared (IR) light emitted diode (LED) transmitter, comprising a first terminal and a second terminal, for emitting an IR;
an IR receiver, comprising a first terminal, a second terminal and a third terminal, for receiving an IR;
a microcontroller, comprising a first pin, a second pin, a third pin, a fourth pin and a fifth pin, wherein the first pin thereof is coupled to the first terminal of the IR LED transmitter, the second pin thereof is coupled to the second terminal of the IR LED transmitter, the third pin thereof is coupled to the first terminal of the IR receiver, the fourth pin thereof is coupled to the second terminal of the IR receiver, the fifth pin thereof is coupled to the third terminal of the IR receiver, wherein in a remote control signal receiving period, the microcontroller receives a IR remote control signal transmitting from a remote control through the third pin thereof, fourth pin thereof and fifth pin thereof according to a specific protocol;

in a distance detecting period, the microcontroller controls the current intensity flowing through the IR LED transmitter through the first pin thereof and the second pin thereof to output a specific IR signal, and then the microcontroller receives the specific IR signal through the third pin thereof, fourth pin thereof and fifth pin thereof, and then determines the distance between the display apparatus and an external object according to the current intensity;

in an ambient light detecting period, the microcontroller detects a photoelectric current of the IR LED transmitter to determine an intensity of an ambient light, wherein the microcontroller controls the backlight illumination of the display panel according to the intensity of the ambient light.

2. The display apparatus according to claim 1, wherein the IR LED transmitter comprises:
a first current-limiting resistor, comprising a first terminal and a second terminal, wherein the first terminal thereof is coupled to the first pin of the microcontroller;
a first LED, comprising a first terminal and a second terminal, wherein the first terminal thereof is coupled to the second terminal of the first current-limiting resistor, the second terminal thereof is coupled to the second pin of the microcontroller;
wherein the distance detecting period, the microcontroller controls the intensity of the specific IR signal emitted from the first LED according to the current intensity outputted from the first pin of the microcontroller.

3. The display apparatus according to claim 2, wherein in the ambient light detecting period, the microcontroller provides a reverse bias to the first LED through the first pin thereof and the second pin thereof and detects the photoelectric current of the first LED to determine the intensity of the ambient light.

4. The display apparatus according to claim 2, wherein the first terminal of the first LED is anode, the second terminal of the first LED is cathode.

5. The display apparatus according to claim 1, wherein the microcontroller further comprises a sixth pin, and the IR LED transmitter comprises:
a transistor, comprising a base terminal, a first emitter/collector terminal and a second emitter/collector terminal, wherein the base terminal thereof is coupled to the first pin of the microcontroller, the first emitter/collector terminal thereof is coupled to a reference voltage source, the second emitter/collector terminal thereof is coupled to the sixth pin of the microcontroller;
a second current-limiting resistor, comprising a first terminal and a second terminal, wherein the first terminal thereof is coupled to the second emitter/collector terminal of the transistor;
a second LED, comprising a first terminal and a second terminal, wherein the first terminal thereof is coupled to the second terminal of the second current-limiting resistor, the second terminal thereof is coupled to the second pin of the microcontroller.

6. The display apparatus according to claim 5, wherein in the distance detecting period, the first pin and the second pin of the microcontroller are in logic low voltage state, the sixth pin of the microcontroller is in a high impedance state, the microcontroller controls the current intensity outputted from the first pin thereof to control the intensity of the specific IR signal emitted from the second LED.

7. The display apparatus according to claim 5, wherein in the ambient light detecting period, the first pin and the second pin of the microcontroller are in logic high voltage state, the sixth pin of the microcontroller is in a logic low voltage state, the microcontroller provides the reverse bias to the second LED and detects the photoelectric current of the second LED through the second pin and sixth pin to determine the intensity of the ambient light.

8. The display apparatus according to claim 5, wherein the first terminal of the second LED is anode, the second terminal of the second LED is cathode.

9. The display apparatus according to claim 1, wherein the remote control signal receiving period is longer than the distance detecting period or the ambient light detecting period.

10. A multipurpose infrared apparatus, adapted for a display apparatus, the multipurpose infrared apparatus comprising:
an infrared (IR) light emitted diode (LED) transmitter, comprising a first terminal and a second terminal, for emitting an IR;
an IR receiver, comprising a first terminal, a second terminal and a third terminal, for receiving an IR;
a microcontroller, comprising a first pin, a second pin, a third pin, a fourth pin and a fifth pin, wherein the first pin thereof is coupled to the first terminal of the IR LED transmitter, the second pin thereof is coupled to the second terminal of the IR LED transmitter, the third pin thereof is coupled to the first terminal of the IR receiver, the fourth pin thereof is coupled to the second terminal of the IR receiver, the fifth pin thereof is coupled to the third terminal of the IR receiver,
wherein
in a remote control signal receiving period, the microcontroller receives a IR remote control signal transmitting from a remote control through the third pin thereof, fourth pin thereof and fifth pin thereof according to a specific protocol;
in a distance detecting period, the microcontroller controls the current intensity flowing through the IR LED transmitter through the first pin thereof and the second pin thereof to output a specific IR signal, and then the microcontroller receives the specific IR signal through the third pin thereof, fourth pin thereof and fifth pin thereof, and then determines the distance between the display apparatus and an external object according to the current intensity;
in an ambient light detecting period, the microcontroller detects a photoelectric current of the IR LED transmitter to determine an intensity of an ambient light, wherein the microcontroller controls the backlight illumination of the display apparatus according to the intensity of the ambient light.

11. The multipurpose infrared apparatus according to claim 10, wherein the IR LED transmitter comprises:
a first current-limiting resistor, comprising a first terminal and a second terminal, wherein the first terminal thereof is coupled to the first pin of the microcontroller;
a first LED, comprising a first terminal and a second terminal, wherein the first terminal thereof is coupled to the second terminal of the first current-limiting resistor, the second terminal thereof is coupled to the second pin of the microcontroller;
wherein the distance detecting period, the microcontroller controls the intensity of the specific IR signal emitted from the first LED according to the current intensity outputted from the first pin of the microcontroller.

12. The multipurpose infrared apparatus according to claim 11, wherein the first terminal of the first LED is anode, the second terminal of the first LED is cathode.

13. The multipurpose infrared apparatus according to claim 10, wherein the microcontroller further comprises a sixth pin, and the IR LED transmitter comprises:
a transistor, comprising a base terminal, a first emitter/collector terminal and a second emitter/collector terminal, wherein the base terminal thereof is coupled to the first pin of the microcontroller, the first emitter/collector terminal thereof is coupled to a reference voltage source, the second emitter/collector terminal thereof is coupled to the sixth pin of the microcontroller;
a second current-limiting resistor, comprising a first terminal and a second terminal, wherein the first terminal thereof is coupled to the second emitter/collector terminal of the transistor;
a second LED, comprising a first terminal and a second terminal, wherein the first terminal thereof is coupled to the second terminal of the second current-limiting resistor, the second terminal thereof is coupled to the second pin of the microcontroller.

14. The multipurpose infrared apparatus according to claim 13, wherein in the distance detecting period, the first pin and the second pin of the microcontroller are in logic low voltage state, the sixth pin of the microcontroller is in a high impedance state, the microcontroller controls the current intensity outputted from the first pin thereof to control the intensity of the specific IR signal emitted from the second LED.

15. The multipurpose infrared apparatus according to claim 13, wherein the first terminal of the second LED is anode, the second terminal of the second LED is cathode.

16. The multipurpose infrared apparatus according to claim 10, wherein the remote control signal receiving period is longer than the distance detecting period or the ambient light detecting period.

* * * * *